United States Patent
Morrell et al.

(10) Patent No.: US 10,407,989 B2
(45) Date of Patent: Sep. 10, 2019

(54) MOBILE OILFIELD TOOL SERVICE CENTER

(71) Applicant: Halliburton Energy Services, Inc., Houston, TX (US)

(72) Inventors: Christopher Lee Morrell, Richmond, TX (US); Christopher R. Moran, Shenandoah, TX (US); Randal Scott Jackson, Loma, CO (US); Dale Wade Oberhoff, Richmond, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 437 days.

(21) Appl. No.: 14/442,460

(22) PCT Filed: Jul. 14, 2014

(86) PCT No.: PCT/US2014/046504
§ 371 (c)(1),
(2) Date: May 13, 2015

(87) PCT Pub. No.: WO2016/010511
PCT Pub. Date: Jan. 21, 2016

(65) Prior Publication Data
US 2016/0273271 A1    Sep. 22, 2016

(51) Int. Cl.
*E04B 1/343*    (2006.01)
*E21B 7/00*    (2006.01)
(Continued)

(52) U.S. Cl.
CPC ...... *E21B 7/00* (2013.01); *B23P 6/00* (2013.01); *E04H 1/005* (2013.01); *E04H 1/1205* (2013.01);
(Continued)

(58) Field of Classification Search
CPC ................. B60P 3/14; E04H 2001/1283
See application file for complete search history.

(56) References Cited

U.S. PATENT DOCUMENTS 4,854,094 A    8/1989    Clark
4,936,414 A    6/1990    Rybka
(Continued)

FOREIGN PATENT DOCUMENTS

WO    03095765    11/2003
WO    2003095765    11/2003
(Continued)

OTHER PUBLICATIONS

International Search Report and Written Opinion for PCT/US2014/046504 dated Apr. 13, 2015.
(Continued)

*Primary Examiner* — Gisele D Ford
(74) *Attorney, Agent, or Firm* — Alan Bryson; C. Tumey Law Group PLLC

(57) ABSTRACT

An example mobile oilfield tool service center includes one or more intermodal containers, each intermodal container including a base, opposing sidewalls, opposing end walls, and a roof, and each intermodal container exhibiting a length, a width, and a height that are each compliant with a global containerized intermodal freight transport system. One or more service components are housed within the one or more intermodal containers for subjecting an oilfield tool to at least one process that repairs or rehabilitates the oilfield tool. A power source can be communicably coupled to the one or more intermodal containers to operate the one or more service components.

9 Claims, 4 Drawing Sheets

(51) Int. Cl.
- *B23P 6/00* (2006.01)
- *E04H 1/00* (2006.01)
- *E04H 1/12* (2006.01)
- *E04H 5/02* (2006.01)
- *E21B 10/02* (2006.01)
- *E21B 10/26* (2006.01)
- *E21B 17/10* (2006.01)

(52) U.S. Cl.
CPC ............ *E04H 5/02* (2013.01); *E21B 10/02* (2013.01); *E21B 10/26* (2013.01); *E21B 17/1078* (2013.01); *E04H 2001/1283* (2013.01)

(56) References Cited

U.S. PATENT DOCUMENTS

| | | | |
|---|---|---|---|
| 5,285,604 A * | 2/1994 | Carlin | B60P 3/14 52/143 |
| 5,493,817 A | 2/1996 | Speer | |
| 6,016,634 A | 1/2000 | Sayer | |
| 6,155,747 A * | 12/2000 | Payne | B09B 3/00 405/129.55 |
| 6,253,849 B1 | 7/2001 | Newman | |
| 6,276,449 B1 | 8/2001 | Newman | |
| 6,983,567 B2 * | 1/2006 | Ciotti | E04B 1/3442 52/64 |
| 7,004,456 B2 | 2/2006 | Newman | |
| 7,222,683 B2 | 5/2007 | Folk et al. | |
| 7,234,524 B2 | 6/2007 | Shaw et al. | |
| 7,793,467 B1 * | 9/2010 | Melton | E04H 5/04 52/173.3 |
| 8,151,537 B2 * | 4/2012 | Pope | E04B 1/3431 52/67 |
| 8,166,715 B2 * | 5/2012 | De Azambuja | B60P 3/34 52/122.1 |
| 8,415,829 B2 | 4/2013 | Di Cristofaro | |
| 9,212,499 B1 * | 12/2015 | Maurer | E04H 5/04 |
| 2002/0153134 A1 | 10/2002 | Newman | |
| 2002/0189173 A1 * | 12/2002 | Staschik | C02F 9/00 52/79.1 |
| 2003/0030279 A1 | 2/2003 | Campion | |
| 2004/0194401 A1 * | 10/2004 | Smith | E04B 1/14 52/169.12 |
| 2004/0226712 A1 | 11/2004 | Hood et al. | |
| 2005/0103491 A1 | 5/2005 | Newman et al. | |
| 2005/0193643 A1 * | 9/2005 | Pettus | B01L 99/00 52/79.1 |
| 2006/0185262 A1 * | 8/2006 | Abler | E04B 1/3442 52/64 |
| 2007/0090629 A1 | 4/2007 | Ohnstad et al. | |
| 2007/0132262 A1 * | 6/2007 | Chui Peng Sun | A61G 3/001 296/24.38 |
| 2008/0134589 A1 * | 6/2008 | Abrams | E04B 1/003 52/79.1 |
| 2008/0202448 A1 | 8/2008 | Marshall | |
| 2008/0250726 A1 * | 10/2008 | Slagel | E04H 1/1205 52/79.8 |
| 2011/0016801 A1 * | 1/2011 | Ziegelman | E04B 1/3483 52/79.9 |
| 2011/0094167 A1 | 4/2011 | Noiseux et al. | |
| 2011/0173907 A1 * | 7/2011 | Katsalidis | E04B 1/3483 52/236.3 |
| 2011/0297675 A1 * | 12/2011 | Johnson | B60P 3/14 220/8 |
| 2012/0006369 A1 * | 1/2012 | Cantin | E04B 1/34305 135/96 |
| 2012/0018495 A1 | 1/2012 | Corcoran | |
| 2012/0077429 A1 * | 3/2012 | Wernimont | F24F 3/161 454/187 |
| 2013/0047521 A1 * | 2/2013 | Yoder | G21F 1/125 52/79.7 |
| 2014/0116870 A1 * | 5/2014 | Kamen | E04H 1/1205 202/83 |
| 2014/0259971 A1 * | 9/2014 | Bikker | A47K 4/00 52/34 |
| 2015/0125267 A1 | 5/2015 | Hatcher, Jr. et al. | |
| 2015/0345160 A1 * | 12/2015 | Slagel | E04H 1/1227 52/1 |
| 2015/0354201 A1 * | 12/2015 | Gruetering | E04H 5/02 52/79.1 |

FOREIGN PATENT DOCUMENTS

| | | |
|---|---|---|
| WO | 2006028994 | 3/2006 |
| WO | 2013000985 | 1/2013 |
| WO | 2014027086 | 2/2014 |
| WO | 2014056548 | 4/2014 |
| WO | 2016010511 A1 | 1/2016 |

OTHER PUBLICATIONS

Chinese Office Action from Chinese Patent Application No. 201480078930.7 dated Mar. 29, 2018, 16 pages.

British Examination Report for Application No. GB1620078.4 dated Nov. 15, 2018.

Search and Exam Report for Application No. GB1819873.9 dated Dec. 19, 2018.

Search and Exam Report for Application No. GB1620078.4 dated Dec. 12, 2018.

* cited by examiner

MOBILE OILFIELD TOOL SERVICE CENTER

BACKGROUND

The present disclosure is related to the oil and gas industry and, more particularly, to a mobile service center used for repairing and rehabilitating oilfield tools.

In the oil and gas industry, well operators face numerous challenges in establishing wellbore drilling facilities and subsequently undertaking drilling operations. Such challenges are often multiplied when attempting to establish and operate a drilling facility in an international location. For instance, it can sometimes be difficult to obtain proper government or local permits to lease or purchase the land where the drilling facility is to be erected. In addition, and since oilfield tools are subject to wear and tear, some government-run oil companies require on-site tooling services to be eligible to bid on drilling contracts. Such on-site services can include oilfield tool repair and/or rehabilitation facilities, such as an on-site drill bit service and/or repair center. When an on-site oilfield tool repair/rehabilitation facility is not required, the oilfield tools must then be transported off-site to a permanent installation for servicing.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION

The present disclosure is related to the oil and gas industry and, more particularly, to a mobile service center used for repairing and rehabilitating oilfield tools.

The present disclosure is directed to systems, apparatus, and method for a mobile oilfield tool service center that can be deployed rapidly on-site, such as at a drilling rig or platform located in a remote area. The structure of the mobile oilfield tool service center may utilize one or more intermodal shipping containers strategically secured together. In some embodiments, for instance, two or more intermodal shipping containers may be connected to increase the size of the mobile oilfield tool service center. The exemplary mobile oilfield tool service center may be capable of undertaking various repair, service, maintenance, assembly, or assessment requirements of a variety of oilfield tools. The exemplary mobile oilfield tool service center may further include a utility skid that includes all utility and support items required to operate the mobile oilfield tool service center such that it is capable of stand-alone operation in remote areas. Deploying the mobile oilfield tool service center adjacent a drilling rig or platform may advantageously provide a well operator with on-site oilfield tool services in close proximity to the wellhead.

The disclosed embodiments can facilitate establishing and operating a drilling facility in an international location. For instance, because of the portable and non-permanent nature of the disclosed mobile oilfield tool service center, the disclosed embodiments can help facilitate obtaining proper government or local permits to lease or purchase the land where the drilling facility is to be erected. In addition, the mobile oilfield tool service center can help satisfy the requirements of government-run oil companies to have on-site tooling services to be eligible to bid on drilling contracts. Such on-site services can include oilfield tool repair and/or rehabilitation facilities, such as an on-site drill bit service and/or repair center. As can be appreciated, the disclosed mobile oilfield tool service center can reduce the capital investment and time to procure localized oilfield tool repair and/or rehabilitation facilities, and to minimize the on-site footprint. As a result, more potential drilling contracts are likely able to be pursued.

Figure 1A:
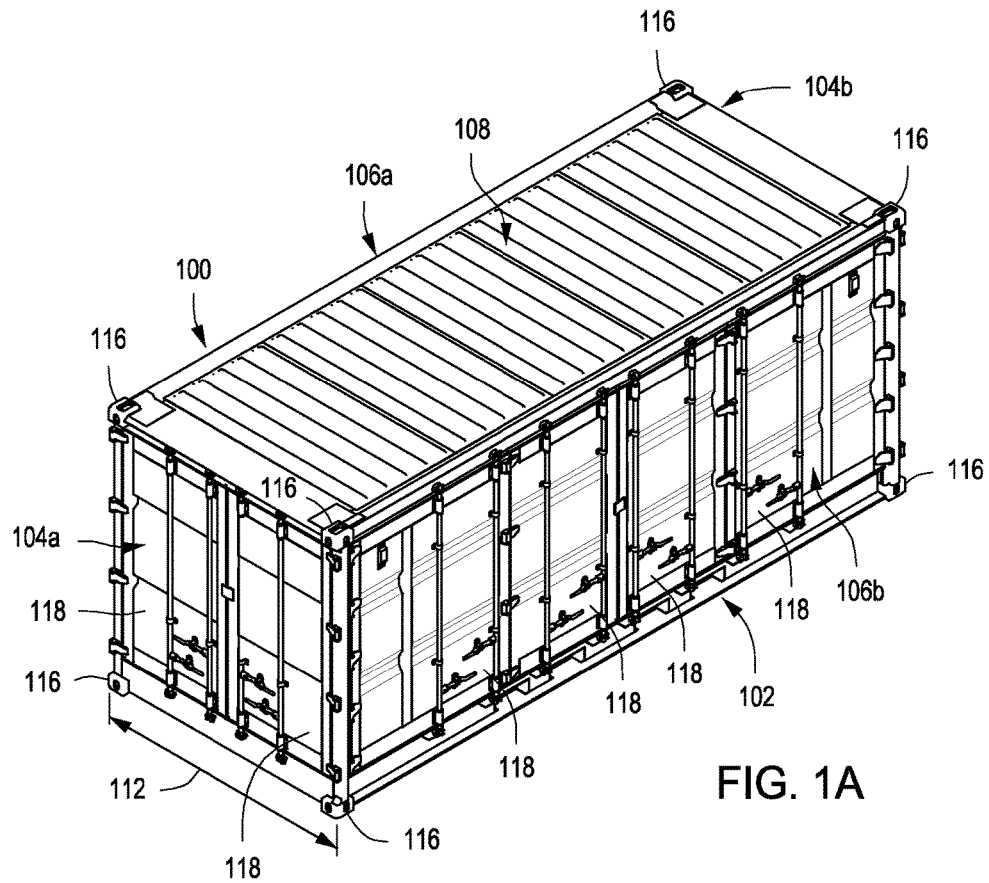
FIGS. 1A and 1B illustrate isometric and side views, respectively, of an exemplary intermodal container that may be used in accordance with the present disclosure, according to one or more embodiments.
Figure 1B:
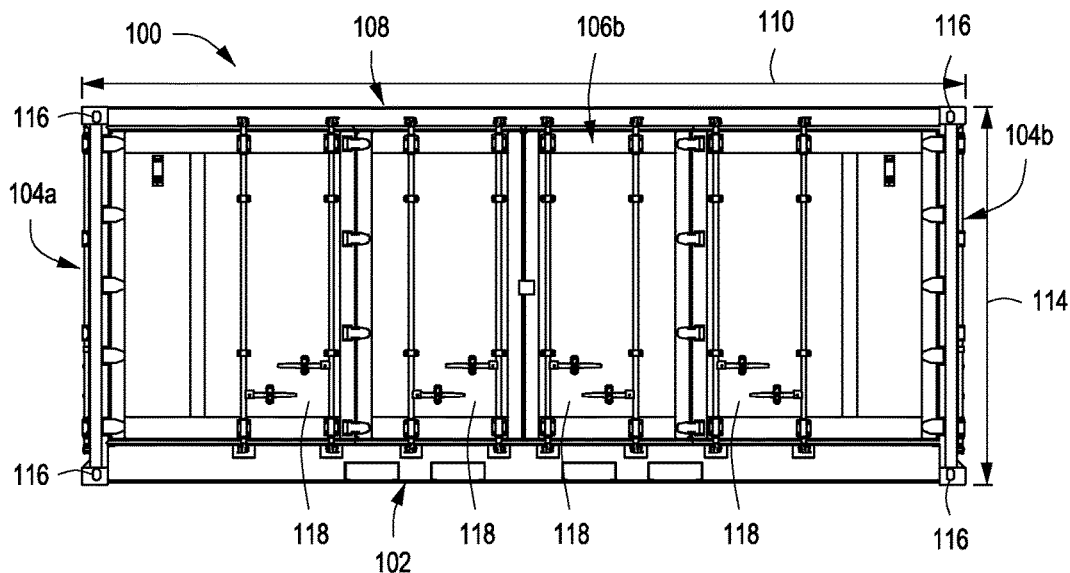

Referring to FIGS. 1A and 1B, illustrated are isometric and side views, respectively, of an exemplary intermodal container 100 that may be used in accordance with the present disclosure, according to one or more embodiments. As illustrated, the intermodal container 100 may be a substantially rectangular structure that includes a base 102, opposing first and second end walls 104a and 104b, opposing first and second sidewalls 106a and 106b that extend between the first and second end walls 104a,b, and a roof 108.

In some embodiments, the intermodal container 100 may comprise an intermodal shipping container, such as a standardized container that is compliant with universal shipping standards of a global containerized intermodal freight transport system that requires specific container dimensions and configurations. In some cases, the universal shipping standards may be dictated by the International Organization for Standardization (ISO). In other cases, however, the universal shipping standards may be dictated by the American National Standards Institute (ANSI), or a combination of ISO/ANSI. The intermodal container 100 may exhibit a length 110 (FIG. 1B), a width 112 (FIG. 1A), and a height 114 (FIG. 1B) that complies with ISO universal standards and configurations such that the intermodal container 100 is able to take advantage of the global containerized intermodal freight transport system. As a result, the intermodal container 100 may be moved from one mode of transport to another, such as from ship, to rail, to truck, etc., without requiring unloading and reloading of the contents disposed within the intermodal container 100.

While the intermodal container 100 is described herein as being compliant with ISO standards and/or configurations, those skilled in the art will readily recognize that the principles of the present disclosure may equally be applied to intermodal shipping containers that are compliant with any universal shipping standards and/or configurations. For instance, intermodal shipping containers are also often required to comply with ANSI specifications to qualify for transport in the global containerized intermodal freight transport system. Moreover, in the future, intermodal shipping containers may be required to meet currently unknown standards and/or configurations and the embodiments of the present disclosure are specifically intended to cover such future universal standards.

In accordance with ISO standards, the width 112 of the intermodal container 100 may be 8 feet (2.438 meters). In some embodiments, the intermodal container 100 may exhibit a length 110 of about 20 feet (i.e., 19 feet and 10.5 inches; 6.058 meters). In other embodiments, however, the length 110 of the intermodal container 100 may be 10 feet (2.990 meters), 30 feet (9.125 meters), or 40 feet (12.192 meters). Moreover, in some embodiments, the height 114 of the intermodal container 100 may be 8 feet and 6 inches (2.591 meters). In other embodiments, however, the intermodal container 100 may be characterized as a "high-cube" container, which exhibits a height 114 of 9 feet and 6 inches (2.896 meters), without departing from the scope of the disclosure.

In accordance with ISO container specifications, the intermodal container 100 further includes castings 116 at each corner (eight in total). Each casting 116 includes or otherwise defines one or more openings that are able to receive twistlock fasteners (not shown), or similar fastening mechanisms or devices, that allow the intermodal container 100 to be secured for shipping, such as being secured to a second intermodal container (not shown) or a shipping vehicle (e.g., boat, truck, etc.). The castings 116 may be ISO and/or ANSI compliant and thereby configured to allow the intermodal container 100 to be stacked with other ISO/ANSI compliant intermodal containers for transport.

The castings 116 also allow the intermodal container 100 to be secured to another intermodal container for operation in accordance with the present disclosure. For instance, in one embodiment, a second intermodal container may be secured to one of the end walls 104*a,b* of the intermodal container 100 via the castings 116. In other embodiments, a second intermodal container may be secured to one of the sidewalls 106*a,b* of the intermodal container 100 via the castings 116. In yet other embodiments, a second intermodal container may be stacked atop the intermodal container 100 and secured thereto via the castings 116. As will be appreciated, stacking two or more intermodal containers 100 atop one another may provide a well operator with a smaller footprint at a drill site, for example.

The intermodal container 100 may also include one or more wall panels 118 extending vertically between the base 102 and the roof 108. As illustrated, one or more wall panels 118 may be arranged at each end wall 104*a,b* and along each sidewall 106*a,b*. The wall panels 118 may provide structure for the intermodal container 100, at least for shipping purposes, but may also be movable or otherwise manipulatable for operation in accordance with the present disclosure. In some embodiments, for instance, one or more of the wall panels 118 may be integrally formed with the intermodal container 100 and form a permanent structural fixture for the intermodal container 100. In other embodiments, one or more of the wall panels 118 may be hinged and otherwise able to be unlatched and pivot between open and closed positions. In yet other embodiments, one or more of the wall panels 118 may be a temporary wall plug that is removable from the intermodal container 100 and able to be stowed (i.e., on the roof 108) for operation, as will be described below. Such wall panels 118 may be removably attached to the base 102, the roof 108, and/or an adjacent wall panel 118 using, for example, mechanical fasteners. Removing the mechanical fasteners may allow the wall panel 118 to be removed from the intermodal container 110. In even further embodiments, one or more of the wall panels 118 may have a man door installed therein that can swing between open and closed positions and thereby provide a well operator access into the intermodal container 100.

According to the present disclosure, the intermodal container 100 may be or otherwise form part of a mobile oilfield tool service center. In some embodiments, multiple intermodal containers 100 may be included in the mobile oilfield tool service center, and each may be transported to a predetermined location, such as a drill site, via the global containerized intermodal freight transport system. As described in greater detail below, each intermodal container 100 may house various service components, machines, and/or equipment associated with the repair, service, maintenance, assembly, rehabilitation, and/or assessment of various oilfield tools and devices. Exemplary oilfield tools and devices that may be serviced in the exemplary mobile oilfield tool service centers described herein include, but are not limited to, drill bits, core heads, coring tools, reamers (e.g., hole enlargement arms), sleeves, rig tools, coring stabilizers or any component of such tools or devices.

Figure 2A:
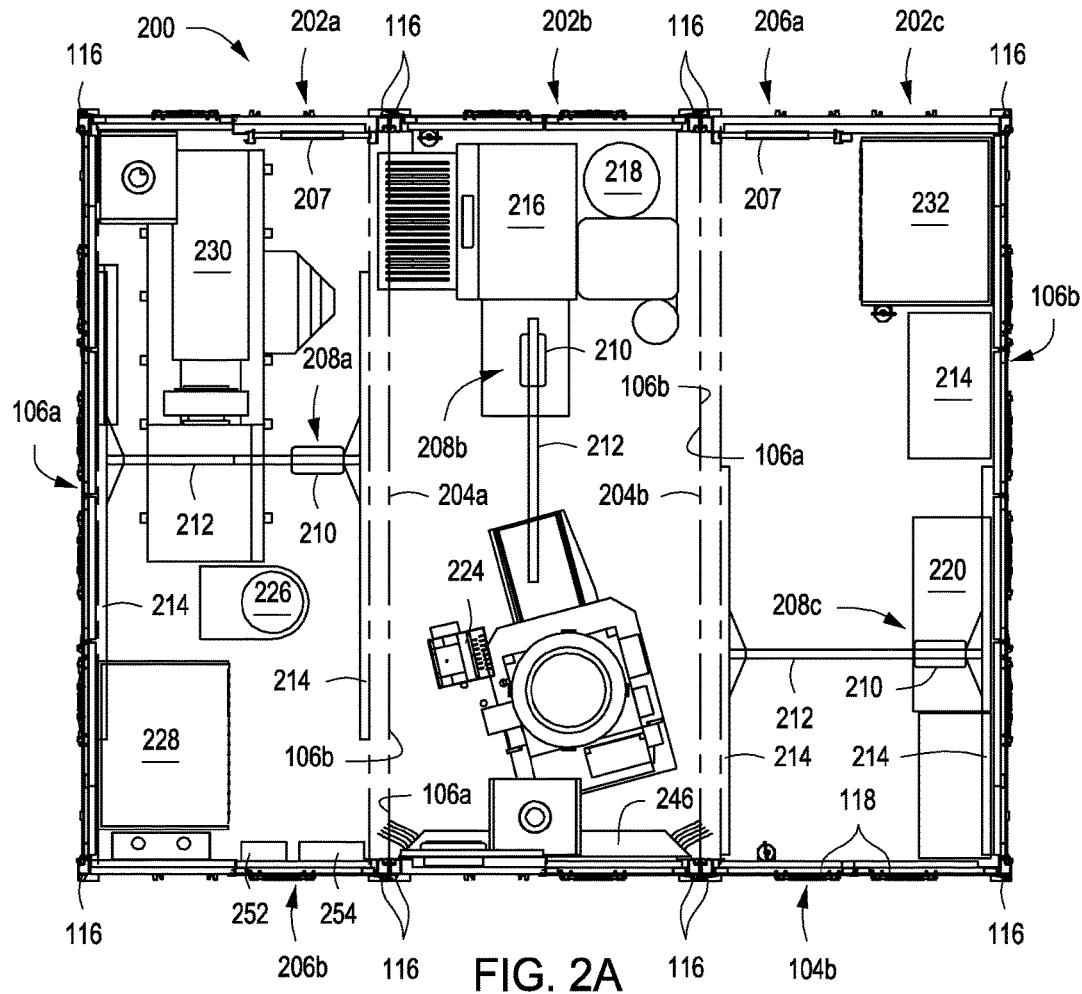
FIGS. 2A and 2B illustrate top and end views, respectively, of an exemplary mobile oilfield tool service center, according to one or more embodiments.
Figure 2B:
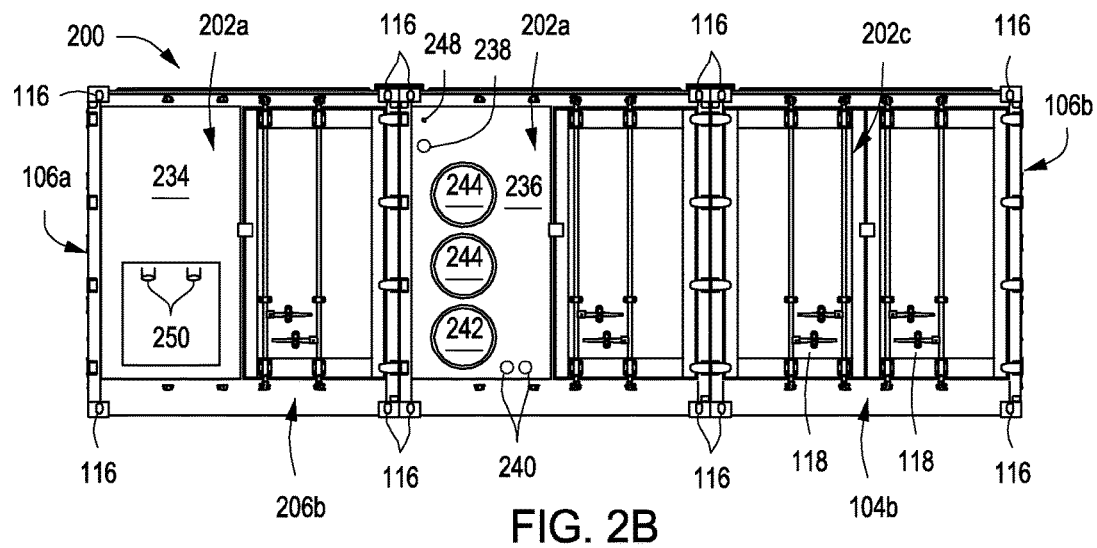

Referring now to FIGS. 2A and 2B, with continued reference to FIGS. 1A and 1B, illustrated are top and end views, respectively, of an exemplary mobile oilfield tool service center 200, according to one or more embodiments. As illustrated, the mobile oilfield tool service center 200 (hereafter "the service center 200") may include a plurality of intermodal containers 202 (shown as first, second, and third intermodal containers 202*a*, 202*b*, and 202*c*) secured together to form a monolithic structure. In FIG. 2A, the roof 108 (FIG. 1A) of each intermodal container 202*a-c* has been omitted so that the contents within each intermodal container 202*a-c* can be observed. While three intermodal containers 202*a-c* are depicted as forming the service center 200, it will be appreciated that more or less than three intermodal containers 202*a-c* may be used to form the service center 200, including a single intermodal container 202, without departing from the scope of the disclosure.

Each intermodal container 202*a-c* may be similar to the intermodal container 100 of FIGS. 1A and 1B and therefore may be best understood with reference thereto, where like numerals represent like elements not described again. Accordingly, each intermodal container 202*a-c* may be designed and otherwise configured as an intermodal shipping container compliant with ISO universal shipping standards and configurations and, therefore, able to be transported via the global containerized intermodal freight transport system. As a result, each intermodal container 202*a-c* may be transported to a specific location, such as a drill site or the like, via ship, rail, and/or flatbed truck without requiring unloading and reloading of the contents disposed therein.

In some embodiments, the service center 200 may be configured to be erected at a wellbore drill site, such as adjacent a drilling rig or drilling platform. Once the intermodal containers 202*a-c* are transported to the specified location, a portable on-site crane or forklift (not shown) may be used to offload the intermodal containers 202*a-c* and arrange them such that they may be secured together to form the service center 200. To accomplish this, each intermodal container 202*a-c* may include castings 116 provided at each corner that allow the intermodal containers 202*a-c* to be secured together either alongside each other or stacked atop one another.

In the illustrated embodiment, the service center 200 is erected by securing the intermodal containers 202*a-c* to each other along adjacent sidewalls 106*a,b*. More specifically, as illustrated, the second intermodal container 202*b* may be coupled to the first intermodal container 202*a* along opposing first and second sidewalls 106*a* and 106*b*, respectively, and thereby define a first sidewall marriage joint 204*a* that runs longitudinally through the interior of the service center 200. Moreover, the third intermodal container 202c may be coupled to the second intermodal container 202b along opposing first and second sidewalls 106a and 106b, respectively, and thereby define a second sidewall marriage joint 204b that runs longitudinally through the interior of the service center 200. As illustrated, the wall panels 118 (FIG. 1A) of the intermodal containers 202a-c that are arranged along the first and second sidewall marriage joints 204a,b may be removed to expand the size of the service center 200 to include the combined interior spaces of each intermodal container 202a-c. As will be appreciated, alternatively, less than all of the wall panels 118 arranged along the first and second sidewall marriage joints 204a,b may be removed, without departing from the scope of the disclosure. In some embodiments, for instance, the wall panels 118 along at least one of the first and second sidewall marriage joints 204a,b may remain intact and one or more of the wall panels 118 may provide a man door that provides a well operator access between adjacent intermodal containers 202a-c.

Once the castings 116 are secured at the corners of adjacent intermodal containers 202a-c, a butting kit (or the like) may be used to bring the floors of the adjacent intermodal containers 202a-c into close alignment and/or engagement. This results in a relatively seamless transition across the floor of adjacent intermodal containers 202a-c. The first and second end walls 104a,b (FIGS. 1A and 1B) of each intermodal container 202a-c may provide and otherwise cooperatively define continuous first and second service center end walls 206a and 206b, respectively. The first service center end wall 206a may include one or more man doors 207 (two shown in FIG. 2A) to allow an operator access to the interior of the service center 200. FIG. 2B depicts an end view of the second service center end wall 206b.

Each intermodal container 202a-c may house or otherwise contain various service components, machines, and/or equipment associated with the repair, service, maintenance, assembly, rehabilitation, and/or assessment of various oilfield tools and devices. In the illustrated embodiment, the service center 200 is specifically configured to service drill bits used to drill wellbores, but could equally be designed and otherwise configured to service any oilfield tool mentioned herein or otherwise known to those skilled in the art. Indeed, the service center 200 may prove useful in the repair and/or rehabilitation of any oilfield tool that may require being subjected to processes such as, but not limited to, washing, media blasting, brazing preparation, heating (i.e., furnace, kiln, etc.), brazing, cleaning, machining, outside and inside grinding, step down grinding, matrix repair, hardfacing, visual inspection, dye penetrant inspection, non-destructive inspection, painting, canning, labelling, and any combination thereof.

Exemplary operation of the service center 200 is now provided in conjunction with the repair and/or maintenance of a drill bit (not shown) used in a drilling operation. It will be appreciated, however, that the present description provides only one possible embodiment or configuration of the service center 200 and should not be considered limiting to the present disclosure. For instance, in other embodiments, the subsequently described processes and/or machines, arranged in any format or sequence, may be used in the repair and/or rehabilitation of any oilfield tool, without departing from the scope of the present disclosure.

A drill bit that needs to be repaired or otherwise serviced may be delivered to the service center 200 and one or more of the wall panels 118 (FIGS. 1A-1B) may be opened or removed to allow the drill bit to be placed within the service center 200. In the illustrated embodiment, one or both of the wall panels 118 of the second end wall 104b of the third intermodal container 202c may be opened or otherwise removed to provide the drill bit entrance into the service center 200 via the third intermodal container 202c. As will be appreciated, the drill bit could equally be introduced into the service center 200 via any end wall 104a,b of the intermodal containers 202a-c or otherwise via the first sidewall 106a of the first intermodal container 202a or the second sidewall 106b of the third intermodal container 202c.

The service center 200 may include one or more multi-directional cranes, shown as first, second, and third cranes 208a, 208b, and 208c, respectively. Each crane 208a-c may include a hoist 210 that is movable on a cross-member 212 so that a well operator may attach the drill bit to one of the cranes 208a-c and move the drill bit to a different location within the corresponding intermodal container 202a-c. The first and third cranes 208a and 208c may further include opposing sidewall supports 214 that support the corresponding hoists 210 and cross-members 212, and thereby allow the cranes 208a,c to move both laterally and longitudinally within the first and third intermodal containers 202a,c, respectively. To transport the drill bit between intermodal containers 202a-c, and otherwise across the first and second sidewall marriage joints 204a,b, the service center 200 may further include or otherwise provide a rolling handling cart 214. The cranes 208a-c may be configured to lift the drill bit onto the rolling handling cart 214 and the operator may then be able to move the drill bit across the first and second sidewall marriage joints 204a,b within the service center 200.

The third crane 208c and the rolling handling cart 214 may first be used to transport the drill bit to a blast cabinet 216 arranged within the service center 200 and, more particularly, within the second intermodal container 202b. Within the blast cabinet 216, the drill bit may be blasted with an abrasive substance or media (e.g., sand, etc.) to clean debris off the drill bit. The media may be provided from an adjacent media hopper 218. Following processing within the blast cabinet 216, the drill bit may be transported to an inspection bench 220 arranged within the third intermodal container 202c. At the inspection bench 220, the drill bit may be evaluated and otherwise inspected by the operator to determine which repairs and/or processes the drill bit needs to undertake.

Based on observed wear or damage ascertained at the inspection bench 220, in some cases, the cutters on the drill bit may need maintenance. The operator may repair various cutters by brazing and/or replacing one or more cutters and brazing new cutters into place. More particularly, the drill bit is first prepared for braze by applying various types of flux to protect the bit from excess braze material. The drill bit may then be transported to a kiln 222 to increase the temperature of the drill bit in preparation for brazing. The adjacent flux oven 224 may be used to heat the replacement cutters to an operating temperature required to perform the brazing process. Both the heating of the bit and the replacement cutters is done so as to heat the material of each to the appropriate temperature, while minimizing exposure to the brazing torch, which may damage the cutters. The cutters are then inserted into corresponding cutter pockets defined in the drill bit to permanently secure them in place.

Following the brazing process, and once cooled to an appropriate temperature, the drill bit may be transported to a bit bath 226 and immersed therein to remove excess brazing material. The drill bit may then be transported back to the blast cabinet 216 for further cleaning and removal of additional brazing material that was not sloughed off in the bit bath 226. In some cases, the drill bit may further require machining to remove excess brazing material that the blast cabinet 216 processing is unable to remove. In such cases, the drill bit may then be transported to a grinding booth 228 arranged within the first intermodal container 220*a* to grind off the excess brazing material. The drill bit may also be transported to a tip grinder 230 arranged within the first intermodal container 202*a*. The tip grinder 230 may be a vertical and/or horizontal grinder configured to grind the drill bit to precise inside and outside diameters.

Following the grinding processes in one or both of the grinding booth 228 and the tip grinder 230, the drill bit may then be transported to a dye check booth 232 arranged within the third intermodal container 202*c*. In the dye check booth 232, the drill bit may be subjected to a dye penetrant and an operator may then evaluate the drill booth for cracks or defects made evident with the dye. If there are any defects or cracks, the drill bit may be reprocessed through one or all of the preceding stations and/or processes until the defect is cured. Once the drill bit passes final inspection, it may be rinsed off and dried in the dye check booth 232. In some cases, the dye check booth 232 may further be used as a location to paint the drill bit. Following processing within the dye check booth 232, the drill bit may be placed within a drill bit can (not shown) and subsequently transported out of the service center 200 via the same way it entered. The drill bit can, with the drill bit disposed therein, may subsequently be delivered to the adjacent drilling rig or platform so that the drill bit may be used in the ongoing drilling operation.

As will be appreciated, having the service center 200 adjacent the drilling rig or platform may provide a well operator with various advantages. For instance, drill bits and other oilfield tools may be serviced (i.e., repaired, rehabilitated, etc.) on-site in close proximity to the wellhead. As a result, the drill bit or oilfield tool is not required to be shipped off-site to a permanent service center but may instead be repaired on-site and returned to service much quicker. Moreover, having an on-site service center 200 that is easily constructed and otherwise mobile, as described above, allows a well operator the ability to bid on drilling contracts that require on-site tooling and servicing. Consequently, the well operator may be able to more readily expand operations into emerging markets.

Figure 3A:
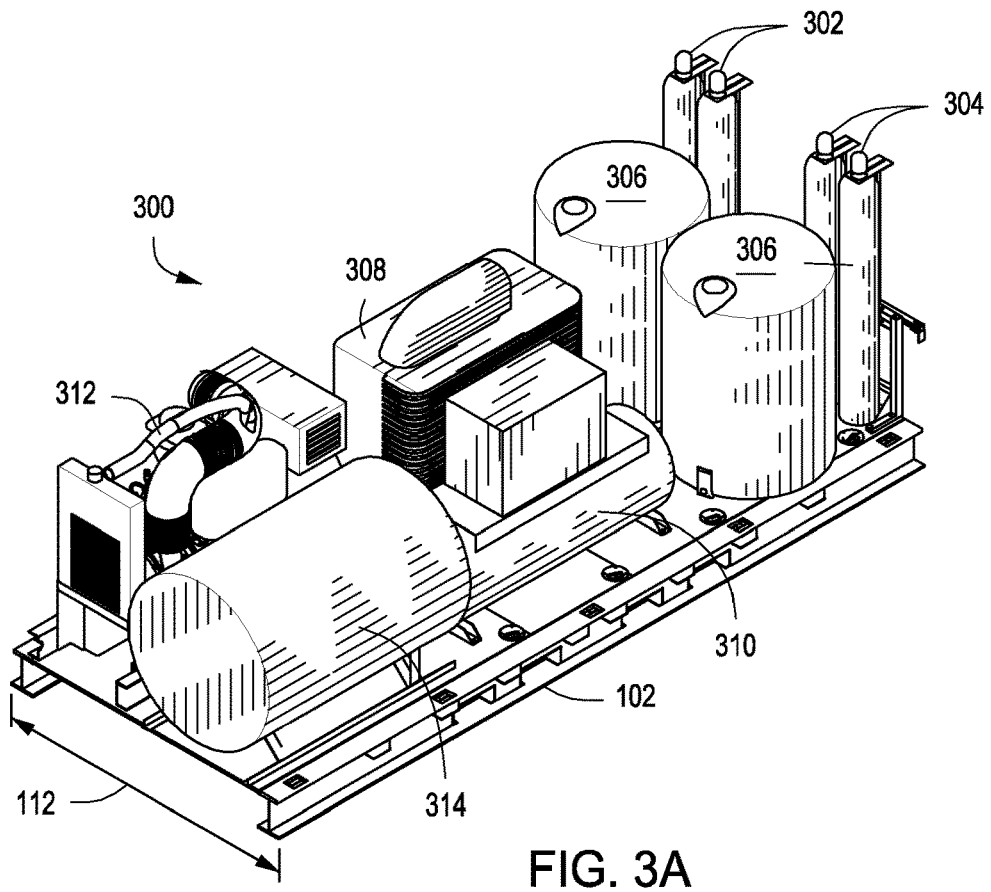
FIGS. 3A and 3B illustrate isometric and top views of an exemplary utility skid that may be used in conjunction with the service center of FIGS. 2A-2B, according to one or more embodiments.
Figure 3B:
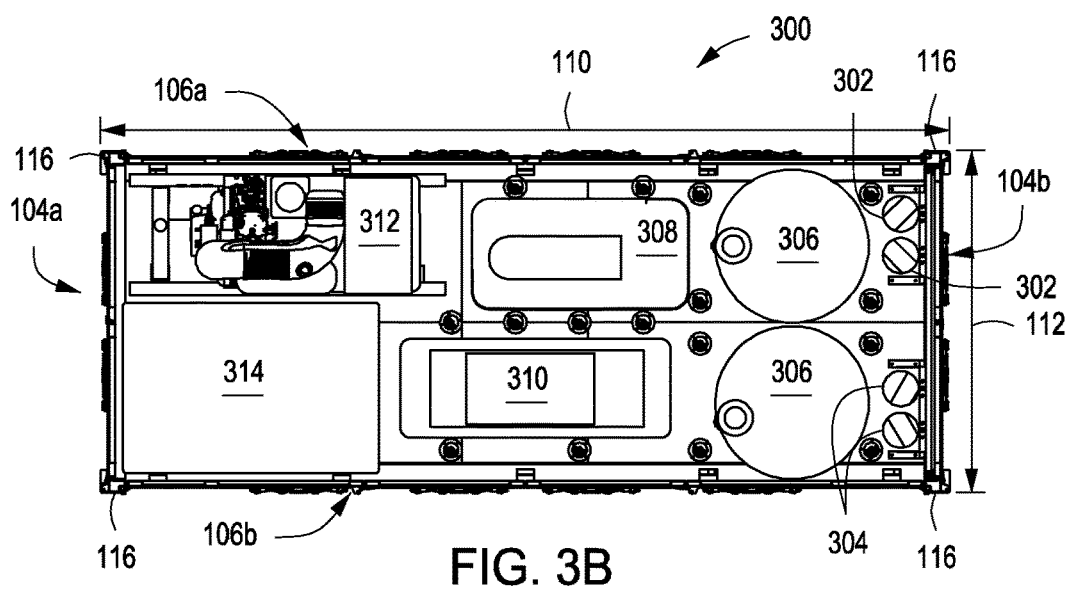

Referring now to FIGS. 3A and 3B, with continued reference to the prior figures, illustrated are isometric and top views, respectively, of an exemplary utility skid 300 that may be used in conjunction with the service center 200 of FIGS. 2A-2B, according to one or more embodiments. In some embodiments, for instance, the utility skid 300 may form an integral part of the service center 200 and otherwise allow the service center 200 to be a stand-alone facility by providing all utility and support features required to operate the service center 200 in remote locations.

The utility skid 300 may be designed and otherwise configured as an intermodal container similar to the intermodal container 100 of FIGS. 1A-1B and therefore may be best understood with reference thereto, where like numerals represent like elements not described again. More particularly, the utility skid 300 may be a substantially rectangular structure that includes the base 102, the opposing first and second end walls 104*a* and 104*b* (FIG. 3B), the opposing first and second sidewalls 106*a* and 106*b* (FIG. 3B) that extend between the first and second end walls 104*a,b*, and the roof 108 (not shown). For clarity in viewing the contents of the utility skid 300, the end walls 104*a,b*, the sidewalls 106*a,b*, and the roof 108 are omitted in the isometric view of FIG. 3A and the roof 108 is omitted in the top view of FIG. 3B.

Similar to the intermodal container 100 of FIGS. 1A-1B, the utility skid 300 may comprise an intermodal shipping container compliant with universal ISO shipping standards and dimensions. Accordingly, the utility skid 300 may exhibit a similar length 110 (FIG. 3B), width 112, and height 114 (not shown) as discussed above with reference to the intermodal container 100. As a result, the utility skid 300 may also be able to take advantage of the global containerized intermodal freight transport system and otherwise be transported via ship, rail, and/or flatbed truck without requiring unloading and reloading of the contents disposed therein. As part of the service center 200 of FIGS. 2A-2B, the particular dimensions of the utility skid 300 may be the same as or different from the intermodal containers 202*a-c* (FIGS. 2A-2B), but nonetheless in accordance with universal ISO sizings and/or configurations. For instance, in some embodiments, the intermodal containers 202*a-c* may exhibit a length 110 of 20 feet, but the utility skid 300 may exhibit a length 110 of 10 feet, without departing from the scope of the disclosure. As will be appreciated, other dimensional variations between the utility skid 300 and the intermodal containers 202*a-c* may be employed, without departing from the scope of the disclosure, and remain in keeping with universal ISO sizings and/or configurations.

As best seen in FIG. 3B, the utility skid 300 may further include ISO/ANSI compliant castings 116 at each corner (eight in total). As a result, the utility skid 300 may be able to be shipped and secured in accordance with ISO specifications. Moreover, in some embodiments, the utility skid 300 may be secured to other intermodal containers via the castings 116, such as one of the intermodal containers 202*a-c* of FIGS. 2A-2B. In other embodiments, however, the utility skid 300 may be configured to be a separate component from the intermodal containers 202*a-c* and otherwise separated spatially therefrom. In either scenario, the utility skid 300 may be communicably coupled to the intermodal containers 202*a-c* to provide and otherwise supply various utility and support features required to operate the service center 200 in a remote location.

As illustrated, the utility skid 300 may enclose or otherwise house one or more support components used to provide some or all utility and support features required to operate a mobile oilfield tool service center, such as the service center 200 of FIGS. 2A and 2B. Exemplary support components that may be housed within the utility skid 300 include, but are not limited to, one or more oxygen gas tanks 302, one or more acetylene gas tanks 304, one or more water holding tanks 306, an environmental control unit 308, an air compressor 310, a generator 312, and a fuel tank 314. As will be appreciated, in other embodiments, additional or other support components known to those skilled in the art may also be housed within support skid 300, without departing from the scope of the disclosure. For instance, in some embodiments, an air filtration unit (not shown) may be housed within the support skid 300.

With continuing reference to FIGS. 3A-3B in conjunction with FIG. 2B, the utility skid 300 may be communicably coupled to the service center 200 via various wall panels arranged at the second service center end wall 206*b*. More particularly, the second service center end wall 206*b* may provide at least a power entry wall panel 234 and a fluid entry wall panel 236. It will be appreciated, however, that the power entry wall panel 234 and the fluid entry wall panel 236 may equally be arranged at any other sidewall of the service center 200, or along different sidewalls, without departing from the scope of the disclosure. The oxygen and acetylene gas tanks 302, 304 may be communicably coupled to the service center 200 at the fluid entry wall panel 236 and, more particularly, at a gas line pass through port 238 defined in the fluid entry wall panel 236. One or more hoses (not shown) may be used to extend between the oxygen and acetylene gas tanks 302, 304 and the gas line pass through port 238. The oxygen and acetylene gas tanks 302, 304 may provide necessary gases for the brazing processes undertaken in the kiln 222 and the flux oven 224.

In some embodiments, as illustrated, two water holding tanks 306 may be housed in the utility skid 300. One water holding tank 306 may provide fresh water to the service center 200, and the other water holding tank 306 may be configured to collect and store waste water generated in the service center 200. The water holding tanks 306 may be communicably coupled to the service center 200 at the fluid entry wall panel 236 and, more particularly, to corresponding water ports 240 defined in the fluid entry wall panel 236. One or more hoses (not shown) may extend from each water holding tank 306 to the water ports 240, and the corresponding water lines may be plumbed to various machines and/or stations within the service center 200. For example, the fresh water holding tank 306 may be used to fill and replenish the bit bath 226, and may also be used to provide fresh water to the dye check booth 232 for rinsing off oilfield tools following a dye penetrant inspection or another non-destructive inspection process. The waste water holding tank 306 may be configured to receive and collect waste water drained from the bit bath 226, the dye check booth 232, or any of the other machines and/or stations within the service center 200.

The environmental control unit 308 may operate as a heating, ventilation, and air conditioning (HVAC) unit configured to regulate the air quality and temperature within the service center 200. The environmental control unit 308 may be communicably coupled to the service center 200 at the fluid entry wall panel 236 and, more particularly, to an air supply vent 242 and one or more air return vents 244 (two shown) defined in the fluid entry wall panel 236. In some embodiments, the environmental control unit 308 may be configured to operate an air conditioner 246 (FIG. 2A) disposed within the service center 200.

The air compressor 310 may provide compressed air to the service center 200 via one or more hoses (not shown) that extend from the air compressor 310 to a compressed air bulkhead fitting 248 defined in the fluid entry wall panel 236. The compressed air provided by the air compressor 310 may support operations in the blast cabinet 216, for instance.

The generator 312 may be used to provide electrical power to the service center 200 and some or all of the electricity-consuming service components housed therein. The generator 312 may be communicably coupled to the service center 200 at the power entry wall panel 234, which may include one or more electrical outlets 250 (two shown). In some embodiments, the power produced by the generator 312 may be fed into a 208V distribution panel 252 and/or a 480V distribution panel 254, each disposed within the service center 200 at or near the second service center end wall 206b. The generator 312 may be any type of power generating device configured to provide electrical power to the service center 200. Accordingly, the generator 312 may prove advantageous in operating the service center 200 in areas that may not include a power grid and/or before electrical power can be extended to the particular site or area.

In some embodiments, the generator 312 may be a "genset" powered by diesel fuel, natural gas, or any other source of fuel stored within the fuel tank 314, which supplies fuel to the generator 312. In some embodiments, as illustrated, the utility skid 300 may include only a single generator 312. In other embodiments, however, the utility skid 300 may include a second generator (not shown) that provides redundancy in the power generating capabilities of the utility skid 300. As will be appreciated, this may prove advantageous in allowing the service center 200 to continuously operate in the event a primary generator fails, is being repaired, or is otherwise temporarily inoperable. While a primary generator 312 is offline, for instance, a secondary generator 312 may be activated to provide the required power for the service center 200, and thereby minimize potential downtime. In some embodiments, however, the generator 312 may be omitted or otherwise disconnected when the service center 200 can be supplied with electrical power from a local power grid or from shore power.

Figure 4:
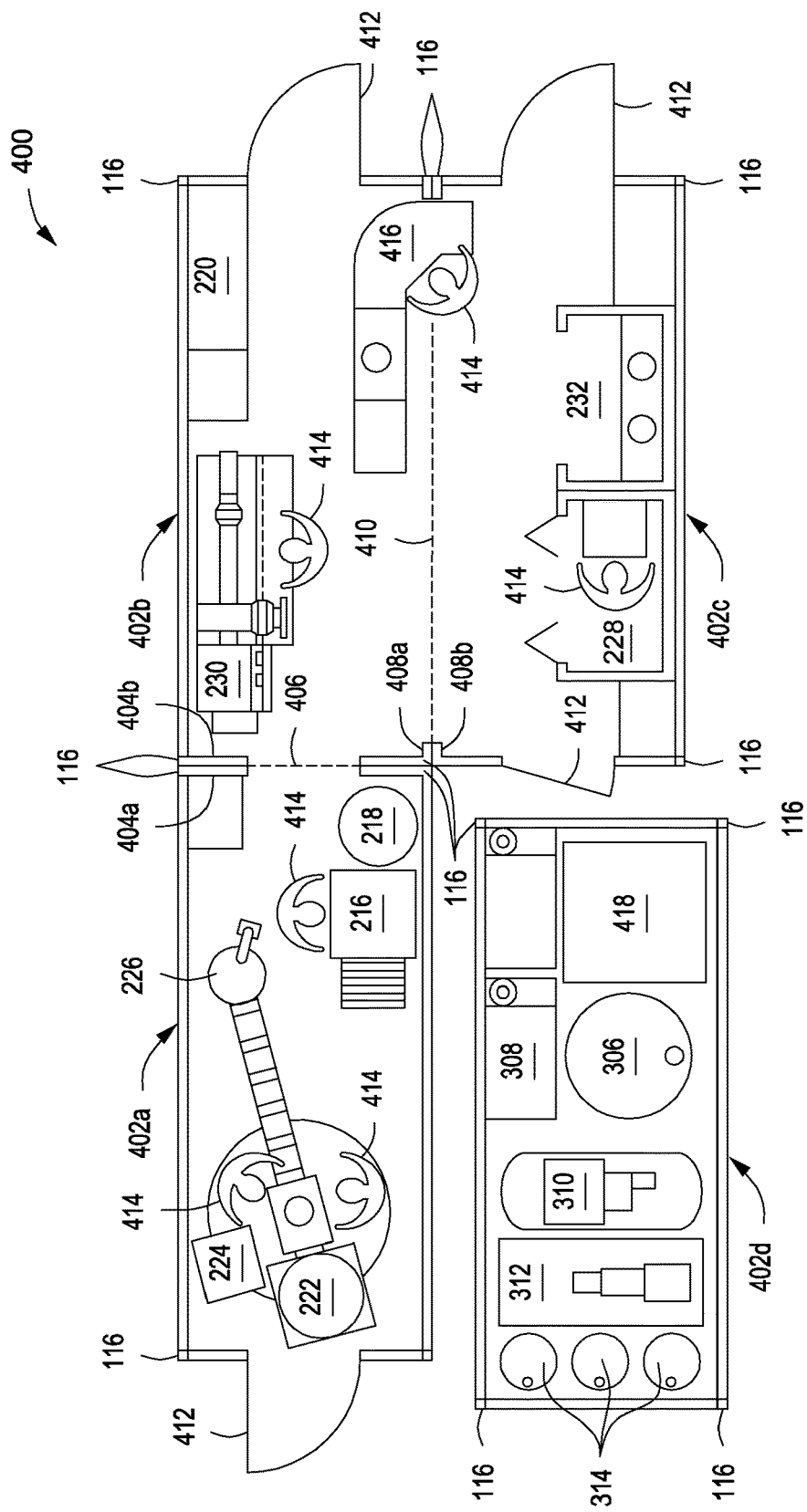
FIG. 4 illustrates another exemplary mobile oilfield tool service center, according to one or more embodiments.

Referring now to FIG. 4, with continued reference to FIGS. 2A-2B and 3A-3B, illustrated is a top view of another exemplary mobile oilfield tool service center 400, according to one or more embodiments. The mobile oilfield tool service center 400 (hereafter "the service center 400") may be similar in some respects to the service center 200 of FIGS. 2A-2B, including the utility skid of FIGS. 3A-3B, and therefore may be best understood with reference thereto, where like numerals represent like elements or components not described again. As illustrated, the service center 400 may include a plurality of intermodal containers 402 (shown as first, second, third, and fourth intermodal containers 402a, 402b, and 402c) secured together to form a monolithic structure. A fourth intermodal container 402d is depicted as being separated from the other intermodal containers 402a-c, but could equally be coupled thereto. As described below, the fourth intermodal container 402d may be similar to the utility skid 300 of FIGS. 3A-3B and otherwise configured to provide utility and support features required to operate the service center 400.

In FIG. 4, the roof 108 (FIG. 1A) of each intermodal container 402a-d has been omitted so that the contents within each can be observed. While four intermodal containers 402a-d are depicted as forming the service center 400, it will be appreciated that more or less than four intermodal containers 402a-d may be used to form the service center 400, including a single intermodal container 402, without departing from the scope of the disclosure.

As with the service center 200, each intermodal container 402a-d of the service center 400 may be similar to the intermodal container 100 of FIGS. 1A and 1B and, therefore, may be designed and otherwise configured as an intermodal shipping container compliant with ISO universal shipping standards and configurations. The intermodal containers 402a-d may each be transportable via the global containerized intermodal freight transport system to a specific location, such as a drill site or the like, via ship, rail, and/or flatbed truck, without requiring unloading and reloading of the contents disposed therein.

Each intermodal container 402a-d may include castings 116 provided at each corner that allow the intermodal containers 402a-d to be secured together end-to-end, alongside each other, or otherwise stacked atop one another. As illustrated, for example, the first and second intermodal containers 402a,b may be secured together at corresponding end walls 404a and 404b, respectively, and thereby define an end wall marriage joint 406 that runs laterally through the interior of the service center 400. Moreover, the second and third intermodal containers 402*b* and 402*c* may also be secured together at corresponding sidewalls 408*a* and 408*b*, respectively, and thereby define a sidewall marriage joint 410 that runs longitudinally through the interior of the service center 400.

As illustrated, some or all of the wall panels 118 (FIG. 1A) of the intermodal containers 402*a-c* that would otherwise be arranged along the end wall and sidewall marriage joints 406, 410 may be removed to expand the size of the service center 400 to include the combined interior spaces of each intermodal container 402*a-c*. Accordingly, coupling the first and second intermodal containers 402*a,b* at the end walls 404*a* and 404*b* and coupling the second and third intermodal containers 402*b* and 402*c* at the sidewalls 408*a,b* effectively increases the size of the service center 400 to include the square footage of each intermodal container 402*a-c*. One or more man doors 412 (four shown) may also be provided in a corresponding one or more of the wall panels 118 (FIG. 1A) in any of the intermodal containers 402*a-c* to provide well operators 414 access to the interior of the service center 400.

Each of the first, second, and third intermodal containers 402*a-c* may house or otherwise contain various service components, machines, and/or equipment associated with the repair, service, maintenance, assembly, rehabilitation, and/or assessment of various oilfield tools and devices. Similar to the service center 200, the service center 400 may prove useful in the repair and/or rehabilitation of any oilfield tool that may require being subjected to processes such as, but not limited to, washing, media blasting, brazing preparation, heating (i.e., furnace, kiln, etc.), brazing, cleaning, machining, outside and inside grinding, step down grinding, matrix repair, hardfacing, visual inspection, dye penetrant inspection, non-destructive inspection, painting, canning, labelling, and any combination thereof. In the illustrated embodiment, the service center 400 includes, for example, the blast cabinet 216, the media hopper 218, the inspection bench 220, the kiln 222, the flux oven 224, the bit bath 226, the grinding booth 228, the tip grinder 230, and the dye check booth 232. Operation of each of the foregoing machines is described above, and therefore will not be discussed again. Moreover, while not shown, the service center 400 may further include one or more cranes and a rolling handling cart, similar to the cranes 208*a-c* and rolling handling cart 214 of FIG. 2A, and used to move an oilfield tool, such as a drill bit, within the service center 400 to different locations and/or stations.

In some embodiments, the service center 400 may further include a computer station 416 and associated office work area for the well operators 414 stationed at the service center 400. The computer station 416 may be connected via satellite or landline in order to provide a well operator with Internet access and communication with global lab networks.

As indicated above, the fourth intermodal container 402*d* may be similar to the utility skid 300 of FIGS. 3A-3B and otherwise also referred to and otherwise characterized as a "utility skid." Accordingly, the fourth intermodal container 402*d* may be best understood with reference to the utility skid 300 of FIGS. 3A-3B, where like numerals represent like components not described again. The fourth intermodal container 402*d* may form part of the service center 400 and otherwise allow the service center 400 to be a stand-alone facility by providing all utility and support features required to operate the service center 400 and, more particularly, the machines and devices housed within the first, second, and third intermodal containers 402*a-c*.

In some embodiments, the fourth intermodal container 402*d* may be secured to one or more of the other intermodal containers 402*a-c* via corresponding castings 116. In other embodiments, however, the fourth intermodal container 402*d* may be separated from other intermodal containers 402*a-c*, as illustrated, but communicably coupled thereto to provide the necessary support features.

Similar to the utility skid 300 of FIGS. 3A-3B, the fourth intermodal container 402*d* may enclose or otherwise house one or more support components used to provide utility and support features required to operate the service center. For instance, the fourth intermodal container 402*d* may include a water holding tank 306, an environmental control unit 308, an air compressor 310, a generator 312, and one or more fuel tanks 314 (three shown). The fourth intermodal container 402*d* may further house a storage box 418 for storing cords, hoses, etc. to facilitate the communicable coupling of the fourth intermodal container 402*d* to the remaining portions of the service center 400.

As with the service center 200, the service center 400 may be erected adjacent a drilling rig or platform and thereby provide a well operator with the advantage of being able to repair and/or rehabilitate drill bits and other oilfield tools on-site and otherwise in close proximity to the wellhead. It will be appreciated that the described and depicted configuration of the service center 400 is merely one exemplary embodiment and, therefore, should not be considered limiting to the present disclosure. In some embodiments, for example, one or more of the intermodal containers 402*a-d* may be stacked atop one another, without departing from the scope of the disclosure. In other embodiments, the first, second, and third intermodal containers 402*a-c* may be arranged and secured together in other lateral configurations not particular depicted or discussed herein.

Therefore, the disclosed systems and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

What is claimed is:

1. A mobile oilfield tool service center, comprising:
   a plurality of intermodal containers, each intermodal container including a base, opposing sidewalls, opposing end walls, and a roof, and each intermodal container exhibiting a length, a width, and a height that are each compliant with a global containerized intermodal freight transport system, wherein the plurality of intermodal containers further comprise one or more marriage joints disposed on the opposing sidewalls and the opposing end walls, and wherein the opposing sidewalls and the opposing end walls include a plurality of wall panels that are removable within the one or more marriage joints;
   one or more service components couple to the based and secured within one of the plurality of intermodal containers in an operating configuration for subjecting an oilfield tool to at least one process that repairs or rehabilitates the oilfield tool, wherein the at least one process is undertaken within the plurality of intermodal containers and the one or more service components is selected form the group consisting of a blast cabinet, an inspection bench, a kiln, a flux oven, a bit bath, a grinding booth, a tip grinder, a dye cheek booth, and a computer station;
   a utility skid communicatively connected to a power entry wall panel in one of the opposing sidewalls or one of the opposing end walls, and to a fluid entry wall panel in one of the opposing sidewalls or one of the opposing end walls; and
   a power source communicably coupled to the power entry wall panel to operate the one or more service components.

2. The mobile oilfield tool service center of claim 1, wherein the oilfield tool is selected from the group consisting of a drill bit, a core head, a coring tool, a reamer, a sleeve, a rig tool, a coring stabilizer, or any component thereof.

3. The mobile oilfield tool service center of claim 1, wherein the at least one process is selected from the group consisting of washing, media blasting, brazing preparation, heating, brazing, cleaning, machining, outside and inside grinding, step down grinding, matrix repair, hardfacing, visual inspection, dye penetrant inspection, non-destructive inspection, painting, canning, labelling, and any combination thereof.

4. The mobile oilfield tool service center of claim 1, wherein the power source is attached to theft utility skid that houses one or more support components required to operate the one or more service components, wherein the utility skid exhibits the length, the width, and the height compliant with the universal shipping container dimensions and configurations.

5. The mobile oilfield tool service center of claim 4, wherein the one or more support components are selected from the group consisting of an oxygen gas tank, an acetylene gas tank, a water holding tank, an environmental control unit, an air compressor, a generator, a fuel tank, and a storage box.

6. A method, comprising:
   delivering a plurality of intermodal containers to a wellbore drilling site, each intermodal container including a base, opposing sidewalls, opposing end walls, and a roof, and each intermodal container exhibiting a length, a width, and a height that are each compliant with a global containerized intermodal freight transport system, and each of the plurality of intermodal containers includes a marriage joint disposed on the opposing sidewalls and the opposing end walls, wherein the marriage joint includes one or more wall panels that are removable;
   assembling the one or more intermodal containers to provide a mobile oilfield tool service center, wherein one or more service components are coupled to the base and secured within one of the plurality of secured intermodal containers in an operating configuration, wherein the one or more service components is selected from the group consisting of a blast cabinet, an inspection bench, a kiln, a flux oven, a bit bath, a grinding booth, a tip grinder, a dye cheek booth, and a computer station;
   securing the plurality of intermodal containers together at one or more marriage joints;
   removing the one or more wall panels in one or more marriage joints;
   delivering a utility skid to the wellbore drilling site, the utility skid housing one or more support components required to operate the one or more service components;
   communicably coupling the utility skid to the mobile oilfield tool service center; and
   powering the one or more service components with the one or more support components via a power entry wall panel in one of the opposing sidewalls or the opposing end walls of one of the plurality of intermodal containers, and via a fluid entry wall pane in the opposing sidewalls or the opposing end walls of one of the plurality of intermodal containers; and
   providing power to the mobile oilfield tool service center to operate the one or more service components within the one or more intermodal containers.

7. The drill bit of claim 6, further comprising providing a man door in at least one of the opposing end walls of at least one of the plurality of intermodal containers.

8. The method of claim 6, further comprising subjecting an oilfield tool to at least one process within the mobile oilfield tool service center to repair or rehabilitate the oilfield tool, wherein the at least one process is selected from the group consisting of washing, media blasting, brazing preparation, heating, brazing, cleaning, machining, outside and inside grinding, step down grinding, matrix repair, hardfacing, visual inspection, dye penetrant inspection, non-destructive inspection, painting, canning, labelling, and any combination thereof.

9. The method of claim 6, wherein the one or more support components are selected from the group consisting of an oxygen gas tank, an acetylene gas tank, a water holding tank, an environmental control unit, an air compressor, a generator, a fuel tank, and a storage box.

* * * * *